(12) United States Patent
Grill et al.

(10) Patent No.: US 6,502,069 B1
(45) Date of Patent: *Dec. 31, 2002

(54) METHOD AND A DEVICE FOR CODING AUDIO SIGNALS AND A METHOD AND A DEVICE FOR DECODING A BIT STREAM

(75) Inventors: Bernhard Grill, Lauf (DE); Jürgen Herre, Buckenhof (DE); Bodo Teichmann, Nürnberg (DE); Karlheinz Brandenburg, Erlangen (DE); Heinz Gerhauser, Waischenfeld (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/530,001

(22) PCT Filed: Jul. 7, 1998

(86) PCT No.: PCT/EP98/04200

§ 371 (c)(1),
(2), (4) Date: Apr. 20, 2000

(87) PCT Pub. No.: WO99/22451

PCT Pub. Date: May 6, 1999

(30) Foreign Application Priority Data

Oct. 24, 1997 (DE) ............................. 197 47 132

(51) Int. Cl.[7] ............................................ G10L 19/12
(52) U.S. Cl. .................... 704/219; 704/220; 704/221
(58) Field of Search ........................... 704/200, 204, 704/219, 220, 230, 262, 500, 501

(56) References Cited

U.S. PATENT DOCUMENTS

| | | | | |
|---|---|---|---|---|
| 6,115,688 A | * | 9/2000 | Brandenburg et al. | 704/503 |
| 6,122,338 A | * | 9/2000 | Yamauchi | 375/377 |
| 6,161,089 A | * | 12/2000 | Hardwick | 704/230 |
| 6,370,507 B1 | * | 4/2002 | Grill et al. | 704/500 |

FOREIGN PATENT DOCUMENTS

| | | |
|---|---|---|
| DE | 3310480 | 2/1986 |
| DE | 19537338 | 3/1997 |

OTHER PUBLICATIONS

Dobson "high quality low complexity scalable wavelet audio coding" IEEE 1997 pp. 327–330.*

Herre et al., "Enhancing the Performance of perceptual Audio Coders by Using Temporal Noise Shaping (TNS)", 101st AES Convention, Los Angeles, CA, PrePrint 4384.

Grill et al., "A Two–or Three– Stage Bit Rate Scalable Audio Coding System", American Engineering Society Convention, Oct. 6, 1995, Seiten 1–8.

Bosi et al., "ISOS/IEC MPEG–2 Advanced Audio Coding", 101st AES Convention, vol. 45, No. 7, Los Angeles 1996 Reprint 4382, Oct. 1997.

* cited by examiner

*Primary Examiner*—David D. Knepper
*Assistant Examiner*—Daniel Abebe
(74) *Attorney, Agent, or Firm*—Beyer Weaver & Thomas

(57) ABSTRACT

The present invention permits a combination of a scalable audio coder with the TNS technique. In a method for coding time signals sampled in a first sampling rate, second time signals are first generated whose sampling rate is smaller than the first sampling rate. The second time signals are then coded according to a first coding algorithm and written into a bit stream. The coded second time signals are, however, decoded again, and, like the first time signals, transformed into the frequency domain. From a spectral representation of the first time signals, TNS prediction coefficients are calculated. The transformed output signal of the coder/decoder with the first coding algorithm, like the spectral representation of the first time signal, undergoes a prediction over the frequency to obtain residual spectral values for both signals, though only the prediction coefficients calculated on the basis of the first time signals are used. These two signals are evaluated against each other. The evaluated residual spectral values are then coded by means of a second coding algorithm to obtain coded evaluated residual spectral values, which, together with the side information containing the calculated prediction coefficients, are written into the bit stream.

8 Claims, 8 Drawing Sheets

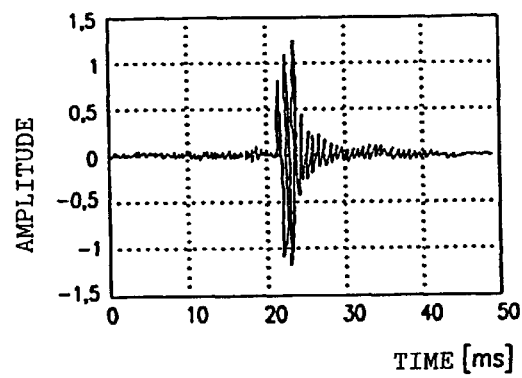
FIG.5
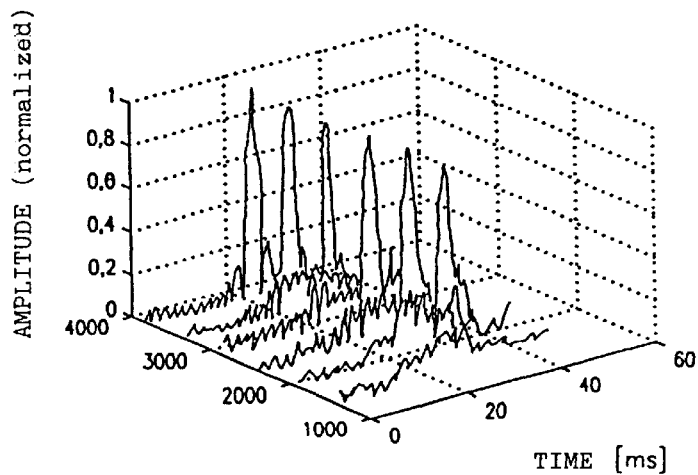
FIG.6A
FIG.6B

METHOD AND A DEVICE FOR CODING AUDIO SIGNALS AND A METHOD AND A DEVICE FOR DECODING A BIT STREAM

FIELD OF THE INVENTION

The present invention relates to scalable audio coders and audio decoders and in particular to scalable coders and decoders for which at least one stage operates in the frequency domain.

BACKGROUND OF THE INVENTION AN DESCRIPTION OF PRIOR ART

Scalable audio coders are coders of modular design. An effort is therefore made to use already existing speech coders, which process signals which e.g. are sampled with 8 kHz and produce data rates of e.g. 4.8 to 8 kilobits per second. These known coders, such as e.g. the coders G.729, G.723, FS1016, CELP or parametric models for MPEG-4-Audio, which are known to persons skilled in the art, serve primarily for coding speech signals and are not generally suitable for coding higher quality music signals since they are normally designed for signals sampled with 8 kHz, so that they can only code an audio bandwidth of 4 kHz at the most. In general, however, they exhibit a low sampling rate and good quality for speech signals.

For the audio coding of music signals, e.g. to achieve HIFI quality or CD quality, with a scalable coder a speech coder is therefore combined with an audio coder, which can code signals with higher sampling rates, e.g. 48 kHz. Obviously it is also possible to replace the speech coder cited above by another coder, e.g. by a music/audio coder according to the Standards MPEG1, MPEG2 or MPEG4.

A chain circuit of this kind comprises a speech coder and a higher quality audio coder. An input signal, having a sampling rate of 48 kHz e.g., is converted by means of a downsampling filter to the appropriate sampling frequency for the speech coder. The sampling rate could, however, also be the same in both coders. The converted signal is then coded. The coded signal can be supplied directly to a bit stream formatting device for transmission. However, it only contains signals with a bandwidth of e.g. 4 kHz at the most. The coded signal is also decoded again and converted by means of an upsampling filter. Because of the downsampling filter, however, the signal now obtained only contains useful information with a bandwidth of e.g. 4 kHz. In addition it must be recorded that the spectral content of the converted coded/decoded signal in the lower band to 4 kHz does not correspond exactly to the first 4 kHz band of the input signal sampled with 48 kHz since in general coders introduce coding errors.

As has already been mentioned, a scalable coder comprises a generally known speech coder and an audio coder which can process signals with higher sampling rates. To be able to transmit signal components of the input signal which have frequencies above 4 kHz, the difference between the input signal at 8 kHz and the coded/decoded converted output signal of the speech coder is formed for each individual discrete-time sampled value. This difference can then be quantized and coded using a known audio coder, as is known to persons skilled in the art. It should be pointed out here that, apart from coding errors, the difference signal which is fed to the audio coder, which can code signals with higher sampling rates, is essentially zero in the lower frequency range. In the spectral range lying above the bandwidth of the upward converted coded/decoded output signal of the speech coder, the difference signal substantially corresponds to the true input signal at 48 kHz.

In the first stage, i.e. the speech coder stage, a coder with low sampling frequency is therefore generally used, since in general a very low bit rate of the coded signal is aimed at. At the present time a number of coders, including the cited coders, work with bit rates of a few kilobits (two to 8 kilobits or also more). Furthermore, these enable a maximum sampling frequency of 8 kHz, since more audio bandwidth is not possible anyway at this low bit rate and the coding at low sampling frequency is more advantageous as regards the computational effort. The maximum possible audio bandwidth is 4 kHz and in practice it is restricted to about 3.5 kHz. If a bandwidth improvement is to be achieved in the further stage, i.e. in the stage with the audio coder, this further stage must work with a higher sampling frequency.

The use of the so-called TNS technique in high quality audio coding to further reduce the amount of data has been known for some time (J. Herre, J. D. Johnston, "Enhancing the Performance of Perceptual Audio Coders by Using Temporal Noise Shaping (TNS)", 101st AES Convention, Los Angeles 1996, Preprint 4384). The TNS technique (TNS=Temporal Noise Shaping), generally speaking, permits temporal shaping of the fine structure of the quantization noise by means of a predictive coding of the spectral values. The TNS technique is based on a consistent application of the dualism between the time domain and the frequency domain. In the technical field it is known that when the autocorrelation function of a time signal is transformed into the frequency domain it gives the spectral power density of this very time signal. The dual case hereto results when the autocorrelation function of the spectrum of a signal is formed and transformed into the time domain. The autocorrelation function transformed into or back into the time domain is also called the square of the Hilbert envelope curve of the time signal. The Hilbert envelope curve of a signal is thus connected directly with the autocorrelation function of its spectrum. The squared Hilbert envelope curve of a signal and the spectral power density of the same thus represent dual aspects in the time domain and in the frequency domain. If the Hilbert envelope curve of a signal remains constant for each partial bandpass signal over a range of frequencies, then the autocorrelation between neighbouring spectral values will also be constant. This means in fact that the series of spectral coefficients is stationary versus frequency, so that predictive coding techniques can be used efficiently to represent this signal and this, furthermore, by using a common set of prediction coefficients.

To clarify the situation, reference is made to FIG. 6A and FIG. 6B. FIG. 6A shows a short section of a temporally strongly transient "castanet" signal with a duration of about 40 ms. This signal was decomposed into a multiplicity of partial bandpass signals, each partial bandpass signal having a bandwidth of 500 Hz. FIG. 6B now shows the Hilbert envelope curves for these bandpass signals with middle frequencies ranging from 1500 Hz to 4000 Hz. To make things clearer, all the envelope curves have been normalized to their maximum amplitude. Clearly the shapes of all the single envelope curves are very similar to one another, which is why a common predictor can be used within this frequency range to code the signal efficiently. Similar observations can be made for speech signals in which the effect of the glottal excitation pulses is present over the whole frequency range because of the nature of the human speech generation mechanism.

FIG. 6B thus shows that the correlation of neighbouring values e.g. at a frequency of 2000 Hz is similar to that at a frequency of e.g. 3000 Hz or 1000 Hz.

Alternatively, the property of spectral predictability of transient signals can be understood by considering the table shown in FIG. 5. At the top left of the table a continuous time signal u(t) is shown in the form of a sine wave. Next to this is the spectrum U(f) of this signal, consisting of a single Dirac pulse. The optimal coding of this signal consists in the coding of spectral data or spectral values since, for the complete time signal, only the magnitude and the phase of the Fourier coefficient have to be transmitted here in order to be able to reconstruct the time signal completely. A coding of spectral data corresponds at the same time to a prediction in the time domain. A predictive coding would thus have to take place here in the time domain. The sinusoidal time signal thus has a flat temporal envelope curve, which corresponds to a maximally non-flat envelope curve in the frequency domain.

The opposite case will now be considered in which the time signal u(t) is a maximally transient signal in the form of a Dirac pulse in the time domain. A Dirac pulse in the time domain corresponds to a "flat" power spectrum, while the phase spectrum rotates according to the time position of the pulse. It is clear that this signal poses a problem for the traditional methods cited above, such as e.g. the transform coding or coding of spectral data or a linear prediction coding of the time domain data. This signal can be coded best and most effectively in the time domain, since only the temporal position and the power of the Dirac pulse have to be transmitted, which, through consistent use of the dualism, means that a predictive coding in the frequency domain also constitutes a suitable method for efficient coding.

It is very important not to confuse the predictive coding of spectral coefficients over the frequency with the known dual concept of the prediction of spectral coefficients from one block to the next, which has already been implemented and is also described in the article cited above (M. Bosi, K. Brandenburg, S. Quakenbusch, L. Fiedler, K. Akagiri, H. Fuchs, M. Dietz, J. Herre, G. Davidson, Yoshiaki Oikawa: "ISO/IEC MPEG-2 Advanced Audio Coding", 101st AES Convention, Los Angeles 1996, Preprint 4382). In the prediction of spectral coefficients from one block to the next, which corresponds to a prediction over the time, the spectral resolution is increased, whereas a prediction of spectral coefficients over the frequency increases the temporal resolution. A spectral coefficient at e.g. 1000 Hz can therefore be determined from the spectral coefficient at e.g. 900 Hz in the same block or frame.

The above considerations thus led to the attainment of an efficient coding method for transient signals. Predictive coding techniques can, taking account of the duality between time and frequency domain, substantially be handled analogously to the already known prediction from a spectral coefficient to the spectral coefficient with the same frequency in the next block. Since the spectral power density and the squared Hilbert envelope curve of a signal are dual to each other, a reduction in a residual signal energy or a prediction gain is obtained which depends on the measure of flatness of the squared envelope curve of the signal and not on the spectral measure of flatness as in the conventional prediction method. The potential coding gain increases as the signals become more transient.

Both the prediction scheme with closed loop, also known as backward prediction, and the prediction scheme with open loop, also known as forward prediction, offer themselves as possible prediction schemes. In the case of the spectral prediction scheme with closed loop (backward prediction) the envelope curve of the error is flat. Expressed differently, the error signal energy is distributed uniformly over the time.

In the case of a forward prediction, however, as shown in FIG. 7, there is a temporal shaping of the noise introduced by quantization. A spectral coefficient to be predicted x(f) is fed to a summation point 600. The same spectral coefficient is also fed to a predictor 610, the output signal of which is also fed, with negative sign, to the summation point 600. The input signal to a quantizer 620 thus represents the difference between the spectral value x(f) and the spectral value $x_p(f)$ calculated by prediction. For forward prediction the total error energy in the decoded spectral coefficient data will remain constant. The temporal shape of the quantization error signal will, however, appear temporally shaped at the output of the decoder since the prediction was applied to the spectral coefficients, whereby the quantization noise is temporally placed under the actual signal and can thus be masked in this way problems of temporal masking e.g. for transient signals or speech signals are avoided.

This type of predictive coding of spectral values is thus called the TNS or temporal noise shaping technique. For clarification of this technique reference is made to FIG. 8A. At the top left in FIG. 8A the temporal behaviour of a strongly transient time signal is shown. Shown opposite this temporal behaviour curve at the top right in FIG. 8A is the section of a DCT spectrum. The graph at the bottom left in FIG. 8A shows the resulting frequency response of a TNS synthesis filter which was calculated by the LPC operation (LPC=Linear Prediction Coding). It should be noted that the (normalized) frequency coordinates in this diagram correspond to the time coordinates due to the time domain and frequency domain dualism. The LPC calculation obviously produces a "source model" of the input signal, since the frequency response of the LPC-calculated synthesis filter resembles the envelope curve of the strongly transient time signal. A representation of the residual spectral values, i.e. of the input signal of the quantizer 620 in FIG. 7, over the frequency is shown at the bottom right in FIG. 8A. A comparison of the residual spectral values after prediction and the spectral values obtained with direct time-frequency transform shows that the residual spectral values have far less energy than the original spectral values. In the example shown the reduction in the energy of the residual spectral values corresponds to a total prediction gain of about 12 dB.

The following points should be noted in connection with the graph at the bottom left in FIG. 8A. For classical use of prediction on time domain signals, the frequency response of the synthesis filter is an approximation of the magnitude spectrum of the input signal. The synthesis filter (re) generates to some extent the spectral shape of the signal from a residual signal with an approximately "white" spectrum. When prediction is used on spectral signals as in the case of the TNS technique, the frequency response of the synthesis filter is an approximation of the envelope curve of the input filter. The frequency response of the synthesis filter is not the result of the Fourier transform of the pulse response, as in the classical case, but the result of the inverse Fourier transform. The TNS synthesis filter (re)generates so to speak the form of the envelope curve of the signal from a residual signal with an approximately "white" (i.e. flat) envelope curve. Thus the graph at the bottom left in FIG. 8A shows the input signal envelope curve as modelled by the TNS synthesis filter. This is here a logarithmic representation of the envelope curve approximation of the castanet signal shown in the figure above it.

Subsequently a coding noise was introduced into the residual spectral values such that a signal/noise ratio of about 13 dB resulted in each coding band with a width of e.g. 0.5 Bark. The error signals in the time domain resulting from the introduction of the quantization noise are shown in FIG. 8B. The left-hand diagram in FIG. 8B shows the error signal due to the quantization noise when using the TNS technique, while in the diagram on the right the TNS technique has not been used, thus providing a comparison. As expected, the error signal in the left-hand diagram is not distributed evenly over the block but is concentrated in the region in which there is a higher signal content, which will optimally mask this quantization noise in the right-hand case, on the other hand, the introduced quantization noise is distributed evenly over the block, i.e. over the time, with the result that in the region at the front where there is no signal, or scarcely so, noise is also present, which will be audible, while in the region in which there is a high signal content there is relatively little noise, through which the masking possibilities of the signal are not completely exploited.

A simple, i.e. non-scalable, audio coder with a TNS filter is described in the following.

An implementation of a TNS filter 804 in a coder is shown in FIG. 9A. This filter is arranged between an analysis filter bank 802 and a quantizer 806. The discrete-time input signal for the coder shown in FIG. 9A is fed into an audio input 800, while the quantized audio signal, i.e. the quantized spectral values, or the quantized residual spectral values are output at an output 808, which may be followed by a redundancy coder. The input signal is therefore transformed into spectral values. On the basis of the calculated spectral values a normal linear prediction computation is performed, e.g. by forming the autocorrelation matrix of the spectral values and using a Levinson-Durbin recursion. FIG. 9B shows a detailed view of the TNS filter 804. The spectral values $x(1), \ldots, x(i), \ldots, x(n)$ are fed in at a filter input 810. It may happen that only a certain frequency range exhibits transient signals, whereas another frequency range is primarily of a stationary nature. This fact is allowed for in the TNS filter 804 through an input switch 812 and an output switch 814, though the primary function of these switches is to provide parallel-to-serial or serial-to-parallel conversion of the data to be processed.

If a certain frequency range is unsteady and promises a certain coding gain through the TNS technique, then only this spectral range is TNS processed, this being achieved in that the input switch 812 starts at the spectral value $x(i)$ for example and sweeps through to the spectral value $x(i+2)$ for instance. The inner region of the filter again comprises the forward prediction structure, i.e. the predictor 610 and the summation point 600.

The calculation for determining the filter coefficients of the TNS filter or for determining the prediction coefficients is performed as follows. The formation of the autocorrelation matrix and the application of the Levinson-Durbin recursion is performed for the highest permissible order of the noise shaping filter, e.g. 20. If the calculated prediction gain exceeds a certain threshold, TNS processing is activated.

The order of the employed noise shaping filter for the current block is then determined by subsequent removal of all coefficients with a sufficiently small absolute value from the end of the coefficient array. This results in the orders of TNS filters having values which normally lie in the range 4–12 for a speech signal.

If a sufficiently high coding gain is determined for a range of spectral values $x(i)$ for example, this range is processed and the residual spectral value $x_R(i)$ appears instead of the spectral value $x(i)$ at the output of the TNS filter. This residual value has a much smaller amplitude than the original spectral value $x(i)$, as can be seen from FIG. 8A. In addition to the normal side information, the side information transmitted to the decoder thus contains a flag showing the use of TNS and, if necessary, information on the destination frequency range and on the TNS filter which was used for coding. The filter data can be represented as quantized filter coefficients.

In analogy to the coder with TNS filter, a decoder having an inverse TNS filter will now be considered.

In the decoder, which is sketched in FIG. 10A, a TNS coding is reversed for each channel. Residual spectral values $x_R(i)$ are requantized in the inverse quantizer 216 and fed into an inverse TNS filter 900 whose construction is shown in more detail in FIG. 10B. As output signal the inverse TNS filter 900 delivers spectral values again, which are transformed into the time domain in a synthesis filter bank 218. The TNS filter 900 includes an input switch 902 and an output switch 908, which again serve chiefly to provide parallel-to-serial or serial-to-parallel conversion of the data to be processed. The input switch 902 also takes account of a possible destination frequency range so as to subject only residual spectral values to inverse TNS coding whereas spectral values which are not TNS coded are allowed to pass through unchanged to an output 910. The inverse prediction filter comprises a predictor 906 and a summation point 904. In contrast to the TNS filter, however, these are connected as follows. A residual spectral value arrives via the input switch 902 at the summation point 904, where it is summed together with the output signal of the predictor 906. As output signal the predictor supplies an estimated spectral value $x_p(i)$. The spectral value $x(i)$ is output at the output of the inverse TNS filter via the output switch. The TNS-related side information is thus decoded in the decoder, the side information including a flag indicating the use of TNS and, if necessary, information concerning the destination frequency range. In addition, the side information contains the filter coefficients of the prediction filter which was used to code a block or "frame".

The TNS method may thus be summarized as follows. An input signal is transformed into a spectral representation by means of a high-resolution analysis filter bank. A linear prediction is then performed in the frequency domain between spectral values which are neighbours as regards frequency. This linear prediction can be interpreted as a filter process for filtering the spectral values which is performed in the spectral domain. In this way the original spectral values are replaced by the prediction errors, i.e. by the residual spectral values. These residual spectral values, quantized and coded just like normal spectral values, are transferred to the decoder, where the values are decoded and inversely quantized. Before using the inverse filter bank (synthesis filter bank) an inverse prediction, inverse that is to the prediction carried out in the coder, is performed in that the inverse prediction filter is employed on the transmitted prediction error signal, i.e. on the requantized residual spectral values.

By employing this technique it is possible to match the temporal envelope curve of the quantization noise to that of the input signal. This permits better exploitation of the masking of the error signals for signals with a pronounced temporal fine structure or a pronounced transient behaviour. In the case of transient signals the TNS technique avoids the so-called "pre-echos", for which the quantization noise already appears prior to the "attack" of such a signal.

As has already been mentioned, in a scalable audio coder a coder with a low sampling frequency is employed in the first stage since a very low bit rate of the coded signal is generally sought. In the second stage there is preferably an audio coder, which codes at higher bit rates but requires a much larger bandwidth and can thus code audio signals with much higher sound quality than the speech coder can. Normally an audio signal which is to be coded and which has resulted at a high sampling rate is first down-converted to a lower sampling rate, e.g. by using a downsampling filter. The reduced sampling rate signal is then fed into the coder of the first stage, the output signal of this coder being written directly into the bit stream which emerges from the scalable audio coder. This coded signal with lower bandwidth is decoded again and is then brought back to the high sampling rate, e.g. by using an upsampling filter, and is then transformed into the frequency domain. Also transformed into the frequency domain is the audio signal originally present at the input of the coder. Two audio signals are now available, the first of them suffering from the coding errors of the coder of the first stage, however. These two signals in the frequency domain can now be fed to a difference element to obtain a signal which represents only the difference between the two signals. In a switching module, which can also be implemented as a frequency selective switch, as is described later, it is possible to determine whether it is better subsequently to process the difference between the two input signals or, instead, to process directly the original audio signal transformed into the frequency domain. In any case the output signal of the switching module is fed to a known quantizer/coder, for example, which, if it functions according to an MPEG standard, performs both a quantization taking account of a psychoacoustic model and then subsequently an entropy coding, preferably using Huffman coding with the quantized spectral values. The output signal of the quantizer and coder is written into the bit stream together with the output signal of the coder of the first stage. At first sight it may seem to be a good idea to place the TNS filter described at the beginning directly behind the switching module, i.e. in front of the quantizer/coder, in order to simply imitate the structure shown in FIG. 10A. A disadvantage of this solution, however, is that the output signal of the switching module is greatly changed in relation to the original temporal audio signal at the input of the coder, with the result that a filter coefficient determination for the TNS filter is not applicable with the same quality.

SUMMARY OF THE INVENTION

It is the object of the present invention to combine the concept of scalable audio coding and the concept of temporal noise shaping so as to benefit from temporal noise shaping in the case of scalable audio coders as well.

In accordance, with a first embodiment of the present invention, this object is achieved by a method for coding discrete first time signals which have been sampled with a first sampling rate, comprising the following steps: generating second time signals, whose bandwidth corresponds to a second sampling rate, from the first time signals, the second sampling rate being equal to or less than the first sampling rate; coding the second time signals according to a first coding algorithm to obtain coded second signals; decoding the coded second signals according to the first coding algorithm to obtain coded/decoded second time signals whose bandwidth corresponds to the second sampling frequency; transforming the first time signals into the frequency domain to obtain first spectral values; calculating prediction coefficients from the first spectral values; generating second spectral values from coded/decoded second time signals, the second spectral values being a representation of the coded/decoded second time signals in the frequency domain; evaluating the first spectral values with the second spectral values to obtain evaluated spectral values whose number corresponds to the number of the first spectral values; performing a prediction of the evaluated spectral values over the frequency by means of the calculated prediction coefficients to obtain evaluated residual spectral values; and coding the evaluated residual spectral values according to a second coding algorithm to obtain coded evaluated residual spectral values.

In accordance with a second embodiment of the present invention, this object is achieved by a method for coding discrete first time signals which have been sampled with a first sampling rate, comprising the following steps: generating second time signals, whose bandwidth corresponds to a second sampling rate, from the first time signals, the second sampling rate being equal to or less than the first sampling rate; coding the second time signals according to a first coding algorithm to obtain coded second signals; decoding the coded second signals according to the first coding algorithm to obtain coded/decoded second time signals whose bandwidth corresponds to the second sampling frequency; transforming the first time signals into the frequency domain to obtain first spectral values; calculating prediction coefficients from the first spectral values; generating second spectral values from coded/decoded second time signals, the second spectral values being a representation of the coded/decoded second time signals in the frequency domain; performing a prediction of the first spectral values and the second spectral values over the frequency to obtain first residual spectral values and second residual spectral values, using the calculated prediction coefficients; evaluating the first residual spectral values with the second residual spectral values to obtain evaluated residual spectral values whose number corresponds to the number of the first spectral values; and coding the evaluated residual spectral values according to a second coding algorithm to obtain coded evaluated residual spectral values.

In accordance with a third embodiment of the present invention, this object is achieved by a method for decoding a bit stream which represents an audio signal, where the bit stream has signals coded according to a first coding algorithm, signals coded according to a second coding algorithm, and side information, where the signals coded according to the second coding algorithm have coded residual spectral values, where the residual spectral values are generated from evaluated spectral values by prediction over the frequency, where prediction coefficients of the prediction are present in the side information, comprising the following steps: decoding the coded signals which have been coded according to the first coding algorithm to obtain coded/decoded second time signals by means of the first coding algorithm; decoding the coded residual spectral values by means of the second coding algorithm to obtain the residual spectral values; transforming the coded/decoded second time signals into the frequency domain to obtain the second spectral values; performing an inverse prediction with the evaluated residual spectral values using the prediction coefficients which are present in the side information to obtain the evaluated spectral values; inversely evaluating the evaluated spectral values and the second spectral values to obtain the first spectral values; and transforming the first spectral values back into the time domain to obtain first time signals.

In accordance with a fourth embodiment of the present invention, this object is achieved by a method for decoding a bit stream which represents an audio signal, where the bit stream has signals coded according to a first coding algorithm, signals coded according to a second coding algorithm, and side information, where the signals coded according to the second coding algorithm have coded residual spectral values, where the residual spectral values are generated from evaluated spectral values by prediction over the frequency, where prediction coefficients of the prediction are present in the side information, comprising the following steps: decoding the coded signals which have been coded according to the first coding algorithm to obtain coded/decoded second time signals by means of the first coding algorithm; decoding the coded residual spectral values by means of the second coding algorithm to obtain the residual spectral values; transforming the coded/decoded second time signals into the frequency domain to obtain the second spectral values; performing a prediction with the second spectral values using the prediction coefficients which are present in the side information to obtain second residual spectral values; inversely evaluating the evaluated residual spectral values and the second residual spectral values to obtain the residual spectral values; performing an inverse prediction with the residual spectral values using the prediction coefficients which are stored in the side information to obtain first spectral values; and transforming the first spectral values back into the time domain to obtain first time signals.

In accordance with a fifth embodiment of the present invention, this object is achieved by an apparatus for coding discrete first time signals which have been sampled with a first sampling rate, comprising: a device for generating second time signals, whose bandwidth corresponds to a second sampling rate, from the first time signals, the second sampling rate being equal to or less than the first sampling rate; a first coder for coding the second time signals according to a first coding algorithm to obtain coded second signals; a decoder for decoding the coded second signals according to the first coding algorithm to obtain coded/decoded second time signals whose bandwidth corresponds to the second sampling frequency; a transformer for transforming the first time signals into the frequency domain to obtain first spectral values; a calculator for calculating prediction coefficients from the first spectral values; a device for generating second spectral values from coded/decoded second time signals, the second spectral values being a representation of the coded/decoded second time signals in the frequency domain; a device for evaluating the first spectral values with the second spectral values to obtain evaluated spectral values whose number corresponds to the number of the first spectral values; a predictor for performing a prediction of the evaluated spectral values over the frequency by means of the calculated prediction coefficients to obtain evaluated residual spectral values; and a second coder for coding the evaluated residual spectral values according to a second coding algorithm to obtain coded evaluated residual spectral values.

In accordance with a sixth embodiment of the present invention, this object is achieved by an apparatus for coding discrete first time signals which have been sampled with a first sampling rate, comprising: a device for generating second time signals, whose bandwidth corresponds to a second sampling rate, from the first time signals, the second sampling rate being equal to or less than the first sampling rate; a first coder for coding the second time signals according to a first coding algorithm to obtain coded second signals; a decoder for decoding the coded second signals according to the first coding algorithm to obtain coded/decoded second time signals whose bandwidth corresponds to the second sampling frequency; a transformer for transforming the first time signals into the frequency domain to obtain first spectral values; a calculator for calculating prediction coefficients from the first spectral values; a device for generating second spectral values from coded/decoded second time signals, the second spectral values being a representation of the coded/decoded second time signals in the frequency domain; a predictor for performing a prediction of the first spectral values and the second spectral values over the frequency to obtain first residual spectral values and second residual spectral values, using the calculated prediction coefficients; a device for evaluating the first residual spectral values with the second residual spectral values to obtain evaluated residual spectral values whose number corresponds to the number of the first spectral values; and a second coder for coding the evaluated residual spectral values according to a second coding algorithm to obtain coded evaluated residual spectral values.

In accordance with a seventh embodiment of the present invention, this object is achieved by an apparatus for decoding a bit stream which represents an audio signal, where the bit stream has signals coded according to a first coding algorithm, signals coded according to a second coding algorithm, and side information, where the signals coded according to the second coding algorithm have coded residual spectral values, where the residual spectral values are generated from evaluated spectral values by prediction over the frequency, where prediction coefficients of the prediction are present in the side information, comprising: a first decoder for decoding the coded signals which have been coded according to the first coding algorithm to obtain coded/decoded second time signals by means of the first coding algorithm; a second decoder for decoding the coded residual spectral values by means of the second coding algorithm to obtain the residual spectral values; a transformer for transforming the coded/decoded second time signals into the frequency domain to obtain the second spectral values; an inverse predictor for performing an inverse prediction with the evaluated residual spectral values using the prediction coefficients which are present in the side information to obtain the evaluated spectral values; a device for inversely evaluating the evaluated spectral values and the second spectral values to obtain the first spectral values; and an inverse transformer for transforming the first spectral values back into the time domain to obtain first time signals.

In accordance with an eight embodiment of the present invention, this object is achieved by an apparatus for decoding a bit stream which represents an audio signal, where the bit stream has signals coded according to a first coding algorithm, signals coded according to a second coding algorithm, and side information, where the signals coded according to the second coding algorithm have coded residual spectral values, where the residual spectral values are generated from evaluated spectral values by prediction over the frequency, where prediction coefficients of the prediction are present in the side information, comprising: a first decoder for decoding the coded signals which have been coded according to the first coding algorithm to obtain coded/decoded second time signals by means of the first coding algorithm; a second decoder for decoding the coded residual spectral values by means of the second coding algorithm to obtain the residual spectral values; a transformer for transforming the coded/decoded second time signals into the frequency domain to obtain the second spectral values; a predictor for performing a prediction with the second spectral values using the prediction coefficients which are present in the side information to obtain second residual spectral values; a device for inversely evaluating the evaluated residual spectral values and the second residual spectral values to obtain the residual spectral values; an inverse predictor for performing an inverse prediction with the residual spectral values using the prediction coefficients which are stored in the side information to obtain first spectral values; and an inverse transformer for transforming the firs t spectral values back into the time domain to obtain first time signals.

The present invention is based on the finding that the determination of the TNS filter coefficients or prediction coefficients must be performed on the basis of spectral values which are not affected by the coder of the first stage. A scalable audio coder should, of course, also be a flexible coder which, as coder of the first stage, can utilize one of the variants cited in the introduction to the description. According to the present invention the determination of the TNS prediction coefficients is performed on the basis of spectral values which are a direct representation of the audio signal at the input of the coder. By employing a filter bank or an MDCT a spectral representation of the audio coder input signal can be created. However, it is now no longer possible to perform the determination of the TNS filter coefficients at the same place in the coder as the actual filtering by the TNS coding filter. The determination of the TNS filter coefficients must therefore take place separately from the actual TNS coding filtering.

According to a first aspect of the present invention the determination of the TNS filter coefficients is performed directly behind the filter bank which transforms the original audio input signal into the frequency domain. Thus signals of the same type, namely signals which have not been TNS processed, are present in front of the summer or the switching module. According to the first aspect of the present invention the TNS filtering with the already determined TNS coefficients takes place behind the switching module and in front of the quantizer/coder, which might operate according to the psychoacoustic model. As will be apparent later, this implementation of the TNS technique in the scalable audio coder involves a modification of the decoder, however.

According to a second aspect of the present invention this decoding is no longer necessary, however. Here TNS prediction coefficients are again determined at the same place as for the first aspect. In contrast to the first aspect of the present invention, the two relevant spectral signals, i.e. the spectral signal with the coding error of the first stage and the spectral signal which is an essentially undistorted representation of the audio input signal, are processed by the TNS coding filter, which operates with the previously determined TNS coefficients, in front of the summing element. It is important to note that the TNS filtering of the spectral signal which bears the coding error of the coder of the first stage works without redetermination of the TNS coefficients simply using the TNS coefficients derived from the error-free audio signal. According to the second aspect of the present invention two signals of the same type, here TNS-processed signals, are again present at the input of the summer or the switching module.

Generally speaking, the first and second aspects of the present invention differ in that in one instance signals which are not TNS-processed are present in front of the summer whereas in another instance TNS-processed signals are subjected to differencing or are fed into the switching module.

The cited conditions are taken into account in the decoders according to the present invention. In the case of a decoder which decodes a signal coded according to the first aspect of the present invention, the TNS decoding, i.e. the use of the TNS decoding filter employing the TNS coefficients determined when coding, which appear again as side information in the bit stream, takes place in front of an inverse switching module which is analogous to the switching module. As for the coder, the inverse switching module is thus supplied with signals which have not been TNS processed in the case of the decoder as well.

In the case of a decoder which decodes coded signals according to the second aspect of the present invention, on the other hand, the inverse switching module is fed with TNS-processed signals. To this end the decoded signal of the coder of the first stage must be converted into the frequency domain and filtered by means of a TNS coding filter which uses the TNS filter coefficients determined in the coder. Only then are signals of the same kind, namely TNS-processed signals, compared in the inverse switching module or the adder arranged in front of it, as was the case in principle for the coder according to the second aspect of the present invention. The output signals of the inverse switching module are finally fed into a TNS decoding filter, the output signals of which are then processed by an inverse filter bank so as to reproduce the original audio signal apart from the coding errors of the whole arrangement. As has already been mentioned, the coder or decoder according to the second aspect of the present invention is preferred among the embodiments according to the present invention since no substantial modifications are necessary in the decoder as the TNS decoding filter or the inverse TNS filter is arranged in front of the inverse filter bank, which corresponds to the arrangement in FIG. 10A.

BRIEF DESCRIPTION OF THE DRAWINGS

Preferred embodiments of the present invention will be described in more detail below, making reference to the enclosed drawings in which

FIG. 5 shows a table illuminating the duality between the time domain and the frequency domain;

FIG. 6A shows an example for a transient signal;

FIG. 6B shows Hilbert envelope curves of partial bandpass signals on the basis of the transient time signal shown in FIG. 6A;

DETAILED DESCRIPTION OF THE PREFERRED EMBODIMENTS

Figure 1:
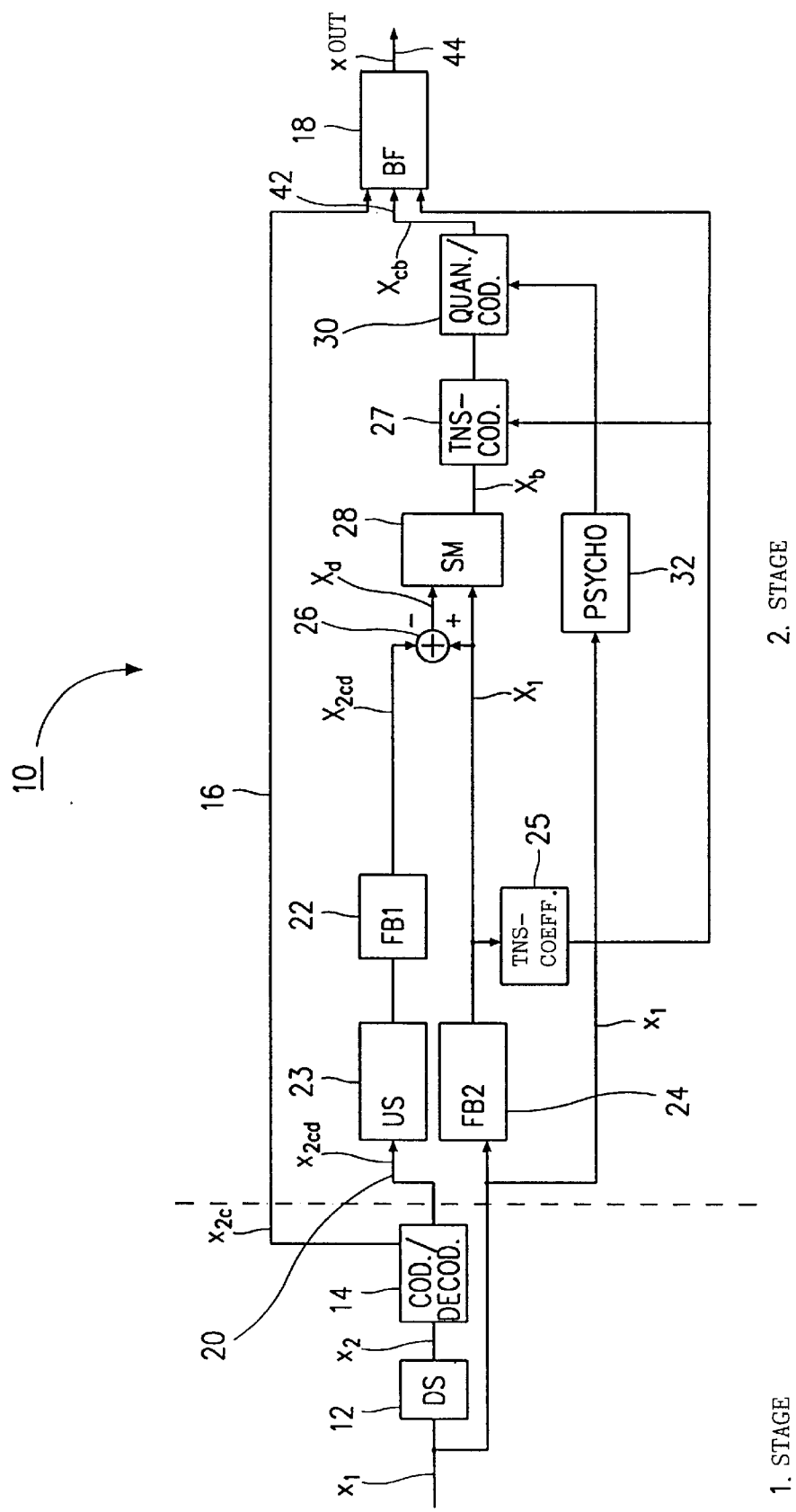
FIG. 1 shows a scalable audio coder according to a first aspect of the present invention.

FIG. 1 shows a schematic block diagram of a scalable audio coder according to the present invention. A discrete time signal $x_1$ which has been sampled with a first sampling rate, e.g. 48 kHz, is brought to a second sampling rate, e.g. 8 kHz, by means of a downsampling filter 12, the second sampling rate being lower than the first sampling rate. The ratio of the first and second sampling rates is preferably a whole number. The output signal of the downsampling filter 12, which may be implemented as a decimation filter, is fed into a coder/decoder 14, which codes its input signal according to a first coding algorithm. The coder/decoder 14 can, as has already been mentioned, be a speech coder of lower order, such as e.g. a coder G.729, G.723, FS1016, MPEG-4 CELP, MPEG-4 PAR. Such coders operate at data rates of 4.8 kilobits per second (FS1016) up to data rates of about 8 kilobits per second (G.729). They all process signals, which have been sampled with a sampling frequency of 8 kHz. For persons skilled in the art, however, it is obvious that any other coders with other data rates or other sampling frequencies can also be employed.

The signal coded by the coder 14, i.e. the coded second signal $x_{2c}$, a bit stream which is dependent on the coder 14 and which is present at one of the cited bit rates, is fed into a bit formatter 18 via a line 16. The function of the bit formatter 18 will be described later. The downsampling filter 12 and the coder/decoder 14 constitute a first stage of the scalable audio coder according to the present invention.

The coded second signals $x_{2c}$ which are output to the line 16 are also decoded again in the first coder/decoder 14 so as to generate coded/decoded second time signals $x_{2cd}$ on a line 20. The coded/decoded second time signals $x_{2cd}$ are discrete-time signals which have a lower bandwidth than the first discrete time signals $x_1$. For the cited numerical example the first discrete time signal $x_1$ has a maximum bandwidth of 24 kHz since the sampling frequency is 48 kHz. The coded/decoded second time signals $x_{2cd}$ have a maximum bandwidth of 4 kHz since the downsampling filter 12 has converted the first time signal $x_1$ to a sampling frequency of 8 kHz through decimation. Within the bandwidth of 0 to 4 kHz the signals $x_1$ and $x_{2cd}$ are the same apart from the coding errors introduced by the coder/decoder 14.

It should be pointed out here that the coding errors introduced by the coder 14 are not always small errors but that they may well be of the same order of magnitude as the useful signal, e.g. when a strongly transient signal is coded in the first coder. For this reason a check is made to see whether a difference coding makes any sense, as is explained later.

The signal $x_{2cd}$ at the output of the coder/decoder 14 is fed into an upsampling filter 23 to convert it back to the high sampling rate again so that it can be compared with the signal $x_1$.

The upsampled signal $x_{2cd}$ and the signal $x_1$ are respectively fed into a filter bank FB1 22 and a filter bank FB2 24. The filter bank FB1 22 generates spectral values $X_{2cd}$ which are a frequency domain representation of the signals $x_{2cd}$. The filter bank FB2 on the other hand generates spectral values $X_1$ which are a frequency domain representation of the original first time signal $x_1$. The output signals of the two filter banks are subtracted in a summer 26. More precisely, the output spectral values $X_{2cd}$ of the filter bank FB1 22 are subtracted from the output spectral values of the filter bank FB2 24. The summer 26 is followed by a switching module SM 28, which has as inputs both the output signal $X_d$ of the summer 26 and the output signal $X_1$ of the filter bank 24, i.e. the spectral representation of the first time signals, which will hereafter be called first spectral values $X_1$.

According to a first aspect of the present invention, prediction coefficients for a TNS filter or for a prediction filter 27 which follows the switching module 28 are calculated by means of a device 25 for calculating the TNS coefficients. The TNS coefficients calculator 25 feeds the coefficients both to the TNS coding filter 27 and to the bit formatter 18, as can be seen from FIG. 1.

The TNS coding filter feeds a quantizer/coder 30, which performs a quantization according to a psychoacoustic model, symbolized by a psychoacoustic module 32, as is known to persons skilled in the art. The two filter banks 22, 24, the summer 26, the switching module 28, the quantizer/coder 30 and the psychoacoustic module 32 constitute a second stage of the scalable audio coder according to the present invention.

In the following the operation of the scalable audio coder is explained making use of FIG. 1. As has already been said, the discrete first time signals $x_1$, which have been sampled with a first sampling rate, are fed into the downsampling filter 12 to generate second time signals $x_2$ whose bandwidth corresponds to a second sampling rate, the second sampling rate being lower than the first sampling rate. From these second time signals $x_2$ the coder/decoder 14 generates second coded time signals $x_{2c}$ according to a first coding algorithm and, by means of a subsequent decoding according to the first coding algorithm, coded/decoded second time signals $x_{2cd}$. The coded/decoded second time signals $X_{2cd}$ are transformed into the frequency domain by the first filter bank FB1 22 to generate second spectral values $X_{2cd}$ which are a frequency domain representation of the coded/decoded second time signals $x_{2cd}$.

It should be pointed out here that the coded/decoded second time signals $x_{2cd}$ are time signals with the second sampling frequency, i.e. 8 kHz in the example. The frequency domain representation of these signals and the first spectral values $X_1$ should now be evaluated, the first spectral values $X_1$ being generated from the first time signal $x_1$, which exhibits the first, i.e. high, sampling frequency, by means of the second filter bank FB2 24. In order to obtain comparable signals with an identical time and frequency resolution, the 8 kHz signal, i.e. the signal with the second sampling frequency, must be converted into a signal with the first sampling frequency. For the scalable coder it is not, however, imperative that the two sampling frequencies should be different, they can also have the same value.

Instead of using the upsampling filter, this can also be achieved by inserting a certain number of zero values between the individual discrete-time scanned values of the signal $x_{2cd}$. The number of zero values is given by (the ratio of first sampling frequency to second sampling frequency) −1. The ratio of the first (high) to the second (low) sampling frequency is called the upsampling factor. As is known to persons skilled in the art, the insertion of zeros, which is possible with very low computing effort, creates an aliasing effect in the signal $x_{2cd}$, as a result of which the low-frequency or useful spectrum of the signal $x_{2cd}$ is repeated, the number of repetitions being equal to the number of zeros inserted. The aliasing-afflicted signal $x_{2cd}$ is now transformed into the frequency domain by the first filter bank FB1 so as to generate second spectral values $X_{2cd}$.

The insertion of e.g. five zeros between each scanned value of the coded/decoded second signal $x_{2cd}$ results in a signal for which it is known from the start that only every sixth scanned value of this signal differs from zero. This fact can be exploited when transforming this signal into the frequency domain by means of a filter bank or MDCT or by means of an arbitrary Fourier transform, since it is possible e.g. to dispense with certain summations which arise for a simple FFT. The known-from-the-start structure of the signal to be transformed can thus be employed in an advantageous manner to save computing time when transforming the signal into the frequency domain.

The second spectral values $X_{2cd}$ are a correct representation of the coded/decoded second time signal $x_{2cd}$ only in the lower part, for which reason only the 1/(upsampling factor) part of all the spectral lines $X_{2cd}$ are used at the output of the filter bank FB1. It should be pointed out here that, due to the insertion of zeros in the coded/decoded second time signal $x_{2cd}$, the number of spectral lines $X_{2cd}$ which are used now has the same time and frequency resolution as the first spectral values $X_1$, which is a frequency representation without aliasing disturbance of the first time signal $x_1$. In the subtracter 26 and in the switching module 28 the two signals $X_{2cd}$ and $X_1$ are evaluated so as to generate evaluated spectral values $X_b$ or $X_1$. The switching module 28 now executes a so-called simulcast difference switchover.

It is not always advantageous to employ a difference coding in the second stage. This is the case, for example, when the difference signal, i.e. the output signal of the summer 26, has a higher energy than the output signal of the second filter bank $X_1$. Since, moreover, an arbitrary coder can be used for the coder/decoder 14 of the first stage, the coder may produce certain signals which are difficult to code. The coder/decoder 14 should preferably preserve phase information of the signal which it has coded, a process which experts call "wave form coding" or "signal form coding". The decision in the switching module 28 of the second stage as to whether a difference coding or a simulcast coding is to be used is made on the basis of the frequency.

"Difference coding" means that only the difference between the second spectral values $X_{2cd}$ and the first spectral values $X_1$ is coded. If such difference coding is not advantageous, however, since the energy content of the difference signal is greater than the energy content of the first spectral values $X_1$, difference coding is not employed. If difference coding is not employed, the first spectral values $X_1$ of the time signal $x_1$, which is sampled with 48 kHz in the example, are switched through by the switching module 28 and used as output signal of the switching module SM 28.

Since the difference formation takes place in the frequency domain, there is no problem in making a frequency selective choice between simulcast and difference coding since the difference between the two signals $X_1$ and $X_{2cd}$ is calculated in any case. The difference formation in the spectrum thus permits a simple frequency selective choice of the frequency ranges which should be difference coded. In principle there could be a changeover from a difference to a simulcast coding for each spectral value individually. This requires too great an amount of side information, however, and is not absolutely necessary. It is thus better e.g. to compare the energies of the difference spectral values and of the first spectral values in frequency groups. Alternatively, certain frequency bands can be specified from the start, e.g. eight bands, each of width 500 Hz, which again results in the bandwidth of the signal $X_{2cd}$ if the time signal $x_2$ has a bandwidth of 4 kHz. A compromise when stipulating the frequency bands consists in balancing the amount of side information to be transmitted, i.e. whether the difference coding is or is not active in a frequency band, against the benefit accruing from difference coding as frequently as possible.

Side information, e.g. 8 bits per band, an on/off bit for the difference coding or some other suitable coding, can be transmitted in the bit stream, showing whether a particular frequency band is difference coded or not. In the decoder, which will be described later, only the corresponding sub-bands of the first coder are then added during reconstruction.

A step of evaluating the first spectral values $X_1$ and the second spectral values $X_{2cd}$ thus preferably comprises the subtraction of the second spectral values $X_{2cd}$ from the first spectral values $X_1$ so as to obtain difference spectral values $X_d$. Also, the energies of a multiplicity of spectral values in a predetermined band, e.g. 500 Hz in the 8 kHz example, are then calculated for the difference spectral values $X_d$ and for the first spectral values $X_1$ in a known manner, e.g. by summing and squaring. A frequency selective comparison of the respective energies is now performed in each frequency band. If the energy in a particular frequency band of the difference spectral values $X_d$ exceeds the energy of the first spectral values $X_1$ multiplied by a predetermined factor k, it is decided that the evaluated spectral values $X_b$ are the first spectral values $X_1$. Otherwise it is decided that the difference spectral values $X_d$ are the evaluated spectral values $X_1$. The factor k can range e.g. from about 0.1 to 10. For values of k less than 1 a simulcast coding is already employed when the difference signal has a smaller energy than the original signal. For values of k greater than 1, on the other hand, a difference coding continues to be used, even when the energy content of the difference signal is already larger than that of the original signal not coded in the first coder. If a simulcast coding is evaluated, the switching module 28 will switch through the output signals of the second filter bank 24 directly. As an alternative to the difference formation which has been described, an evaluation can also be performed in which e.g. a ratio is formed or a multiplication or some other operation is performed on the two cited signals.

The TNS coding filter 27, which is connected to the output of the switching module 28, now performs a prediction of the evaluated spectral values $X_b$ over the frequency using the prediction coefficients evaluated by the TNS coefficients calculator 25 so as to obtain evaluated residual spectral values.

The evaluated residual spectral values, which correspond either to the difference spectral values $X_d$ or to the first spectral values $X_1$, as determined by the switching module 28, are now quantized by a first quantizer/coder 30 taking account of the psychoacoustic model, which is known to persons skilled in the art and which is present in the psychoacoustic model 32, and are then coded, preferably by means of a redundancy reducing coding, e.g. using Huffman tables. As is also known to persons skilled in the art, the psychoacoustic model is calculated from time signals, which is why the first time signal $x_1$ with the high sampling rate is fed directly into the psychoacoustic model 32, as can be seen in FIG. 1. The output signal $X_{cb}$ of the quantizer/coder 30 is routed directly to the bit formatter 18 on the line 42 and is written into the output signal $x_{AUS}$.

A scalable audio coder with a first and a second stage has been described above. The concept of the scalable audio coder according to the present invention is also capable of cascading more than two stages. Thus it would e.g. be possible with an input signal $x_1$ which is sampled with 48 kHz to code the first 4 kHz of the spectrum in the first coder/decoder 14 by reducing the sampling rate to achieve a signal quality after decoding which corresponds roughly to the speech quality of telephone calls. In the second stage a bandwidth coding of up to 12 kHz could be performed, implemented by the quantizer/coder 30, to achieve a tone quality which corresponds roughly to HIFI quality. It is obvious to persons skilled in the art that a signal $x_1$ which is sampled with 48 kHz can have a bandwidth of 24 kHz. The third stage, implemented by the additional quantizer/coder 38, could now perform a coding up to a bandwidth of max. 24 kHz or, for a practical example, up to e.g. 20 kHz, to achieve a tone quality which corresponds roughly to that of a compact disk (CD).

Apart from the side information which must also be transmitted, the coded data stream $x_{AUS}$ comprises the following signals:

the coded second signals $x_{2c}$ (full spectrum from 0 to 4 kHz); and the coded evaluated residual spectral values (full spectrum from 0 to 12 kHz for a simulcast coding or coding errors from 0 to 4 kHz of the coder 14 and full spectrum from 4 to 12 kHz for a difference coding).

It is possible that in the transition from the first coder/decoder 14 to the quantizer/coder 30 in the example transition disturbances may accompany the transition from 4 kHz to a value greater than 4 kHz. These transition disturbances may manifest themselves in erroneous spectral values which are written into the bit stream $x_{AUS}$. The total coder/decoder can now be so specified that e.g. only the frequency lines up to 1/(upsampling factor minus x) (x=1, 2, 3) are used. As a result the last spectral lines of the signal $X_{2cd}$ at the end of the maximum bandwidth attainable with the second sampling frequency are not considered. Implicitly this means that an evaluation function is employed which in the cited case is a rectangular function which is zero above a certain frequency value and which has a value of 1 below this. Alternatively a "softer" evaluation function can also be employed, which reduces the amplitude of spectral lines which have transition disturbances, after which the spectral lines of reduced amplitude are then considered.

It should be noted that the transition disturbances are not audible since they are eliminated again in the decoder. The transition disturbances can, however, lead to excessive difference signals for which the coding gain due to the difference coding is then reduced. By evaluation with an evaluation function such as that described above, the loss in coding gain can therefore be kept within limits. An evaluation function other than the rectangular function will not require any additional side information since, like the rectangular function, it can be agreed a priori for the coder and decoder.

Figure 2:
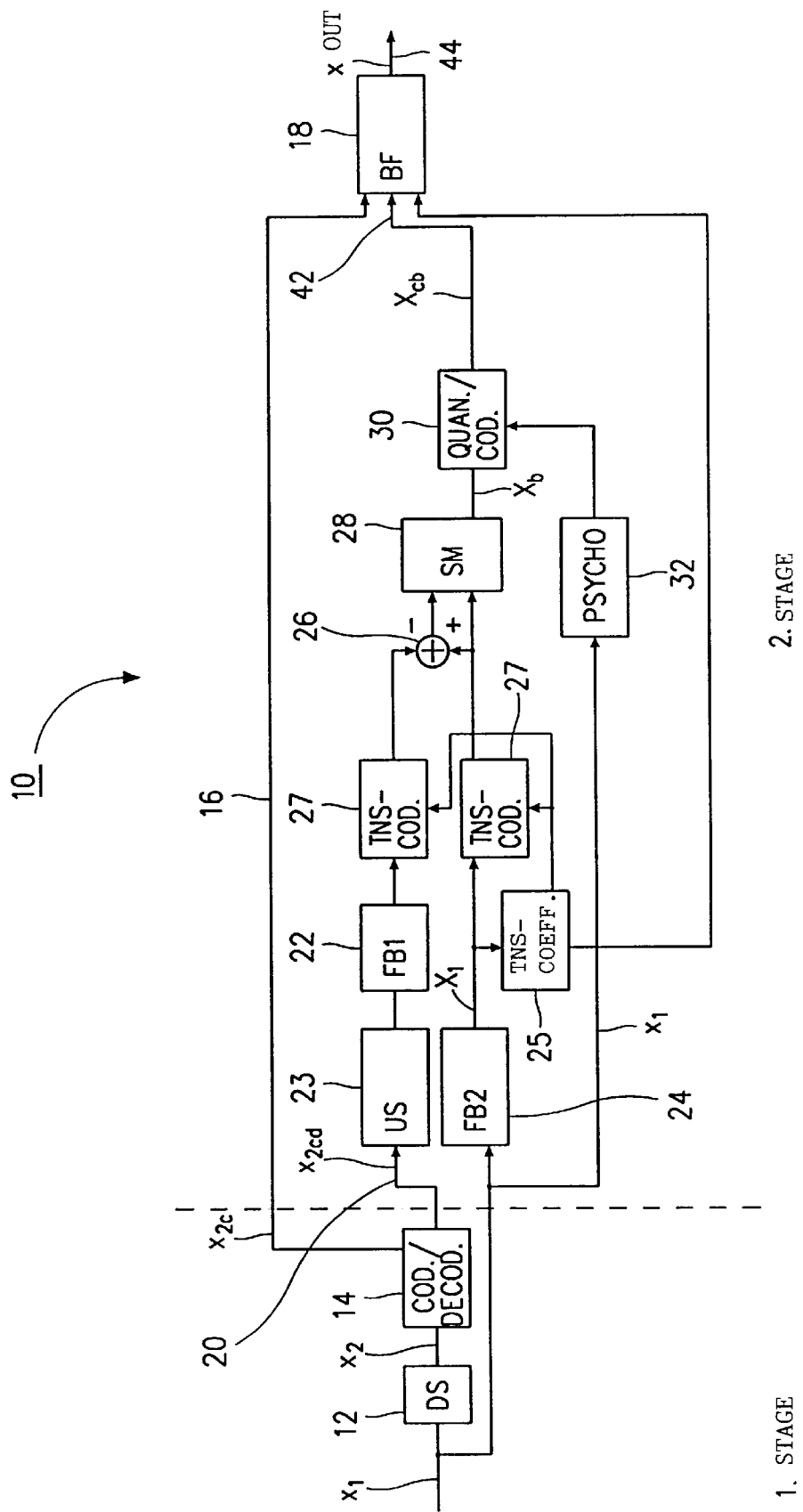
FIG. 2 shows a scalable audio coder according to a second aspect of the present invention.

FIG. 2 shows a practical implementation of a coder which works according to the second aspect of the present invention. The same elements as in FIG. 1 bear the same reference numerals and, unless specifically stated otherwise, fulfil the same functions. As has already been explained, the second aspect of the present invention is better for the decoder since it requires less modifications to be made. In contrast to the scalable audio coder of FIG. 1, in FIG. 2 a second TNS coding filter 27 is located behind the filter bank 1 of position 22. Furthermore, the first TNS coding filter is already located behind the filter bank 2 24, which means that the summers in the device 26 and the switching module 28 process TNS-processed spectral values, namely first residual spectral values and second residual spectral values. In the switching module 28 and the summer 26 the first residual spectral values are thus evaluated with the second residual spectral values to obtain evaluated residual spectral values, which are then fed into the quantizer/coder 30. Thus this quantizes and codes evaluated residual spectral values, as in FIG. 1. The TNS coefficients calculator 25 feeds both the TNS coder behind the filter bank 24 and the TNS coder behind the filter bank 22, the output signal of the filter bank 22 being subjected to TNS filtering, however, which is performed on the basis of the TNS coefficients which have been calculated from the output signal of the filter bank 24. As in FIG. 1, the TNS coefficients of the bit stream formatter 18 are supplied as side information.

Figure 3:
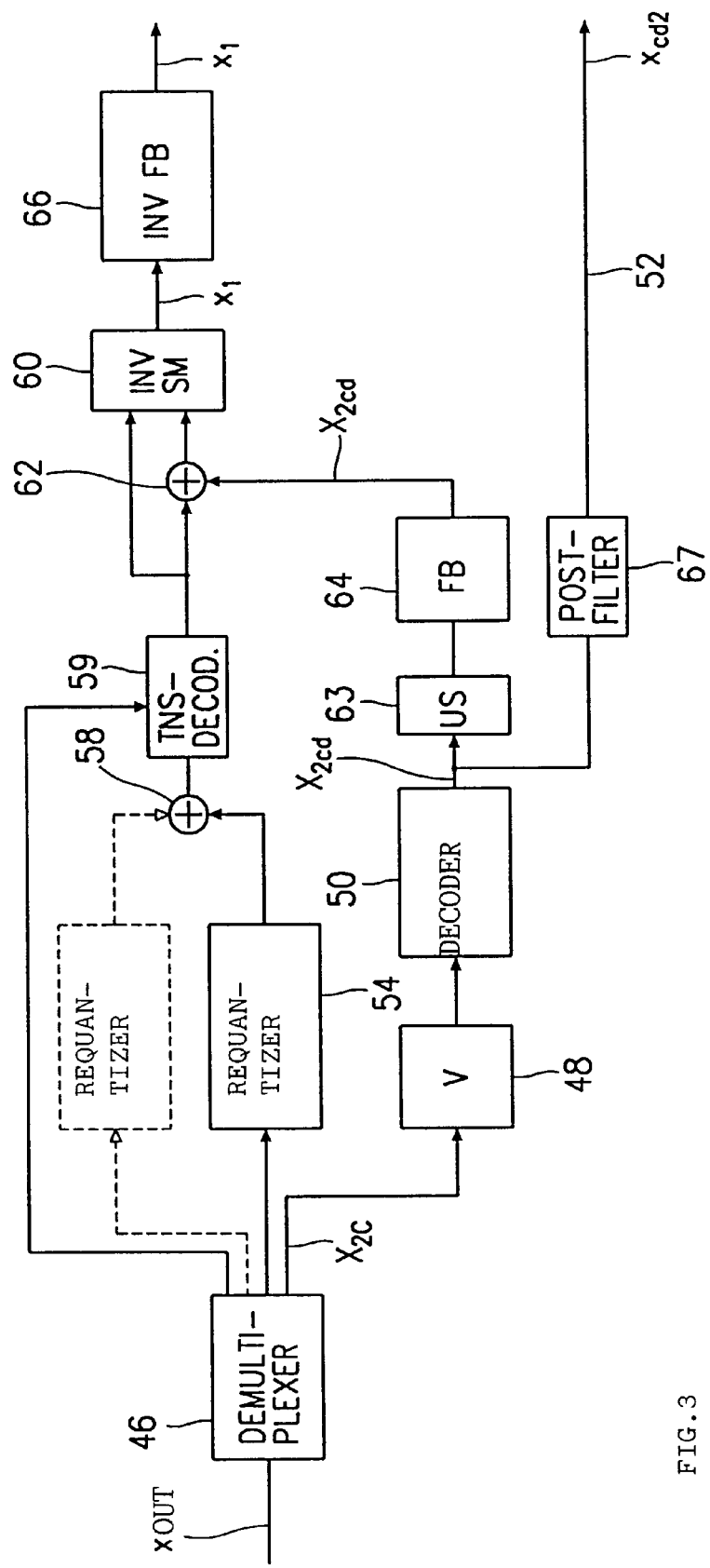
FIG. 3 shows a decoder according to the first aspect of the present invention.

FIG. 3 shows a decoder for decoding the data coded by the scalable audio coder shown in FIG. 1. The output data stream of the bit formatter 18 of FIG. 1 is fed to a demultiplexer 46 to obtain the signals on the lines 42 and 16 of FIG. 1 from the data stream $x_{AUS}$. The coded second signals $x_{2C}$ are fed into a delay element 48, the delay element 48 introducing a delay into the data which may be necessary on account of other aspects of the system and which forms no part of the present invention.

After the delay the coded second signals $x_{2c}$ are fed into a decoder 50, which decodes by means of the first coding algorithm, which is also implemented in the coder/decoder 14 of FIG. 1, so as to generate the coded/decoded second time signal $x_{cd2}$, which can be output via a line 52, as shown in FIG. 3. The coded evaluated residual spectral values are requantized by means of a requantizer 54 to obtain the evaluated residual spectral values. A summer 58 forms the sum of the residual spectral values and the residual spectral values of an optional further layer (shown dashed).

To create the same conditions again in front of a summer 62, which works analogously to the summer 26, the summer 58 is followed by a TNS decoding filter 59. The TNS decoding filter 59 performs an inverse TNS filtering with the output signal of the summer 58. Here the prediction coefficients which are contained in the side information are used, these having been calculated by the TNS coefficients calculator 25 of FIG. 2. At the output of the TNS decoder 59 are the decoded evaluated spectral values $X_b$.

It should be pointed out here that, as can be seen from FIG. 3, the coded/decoded second time signal must first be converted by means of a suitable upsampling filter 63 and transformed into the frequency domain by means of a filter bank 64 to obtain the second spectral values $X_{2cd}$ since the summation of the summer 62 is a summation of spectral values. The filter bank 64 is preferably identical to the filter banks FB1 22 and FB2 24, whereby only one device has to be implemented, which, equipped with suitable buffers, is supplied with different signals in succession. Alternatively, different filter banks, provided they are suitable, may be used.

As has already been mentioned, information which is used in the quantization of spectral values is derived from the first time signal $x_1$ by means of the psychoacoustic module 32. A particular effort is made to quantize the spectral values as coarsely as possible to minimize the amount of data for transmission. On the other hand, disturbances introduced by the quantization should not be audible. A model which is known per se and which is contained in the psychoacoustic module 32 is used to calculate an allowed disturbance energy which can be introduced by the quantization without any disturbance being audible. A control now controls the quantizer in a known quantizer/coder to perform a quantization which introduces a quantization disturbance which is smaller or equal to the allowed disturbance. This is constantly monitored in known systems in that the signal quantized by the quantizer, which is contained in e.g. block 30, is dequantized again. By comparing the input signal in the quantizer with the quantized/dequantized signal the disturbance energy actually introduced by the quantization is calculated. The actual disturbance energy of the quantized/ dequantized signal is compared in the control with the allowed disturbance energy. If the actual disturbance energy is greater than the allowed disturbance energy, the control in the quantizer will increase the fineness of the quantization. The comparison between the allowed and actual disturbance energy typically takes place per psychoacoustic frequency band. This method is known and is used by the scalable audio coder according to the present invention if simulcast coding is employed.

A so-called post-filter 67, which can perform certain post-filterings of the output signal of the decoder, which corresponds to the decoder of the first stage, is located at the output of the decoder 50. This filter does not constitute any part of the present invention, however.

Figure 4:
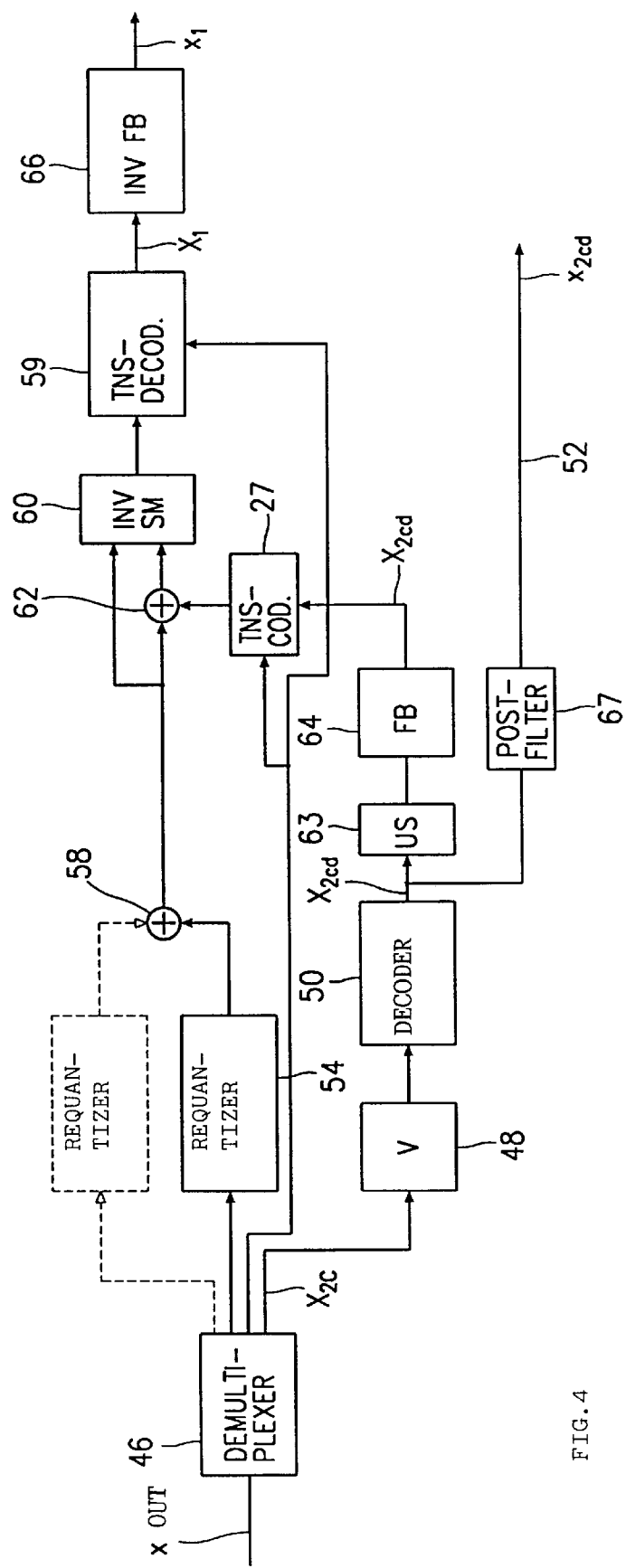
FIG. 4 shows a decoder according to the second aspect of the present invention.
Figure 7:
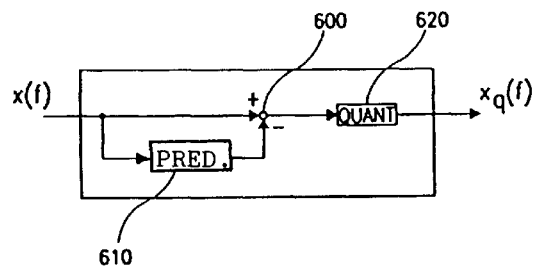
FIG. 7 shows a schematic representation of the prediction in the frequency domain.
Figure 8A:
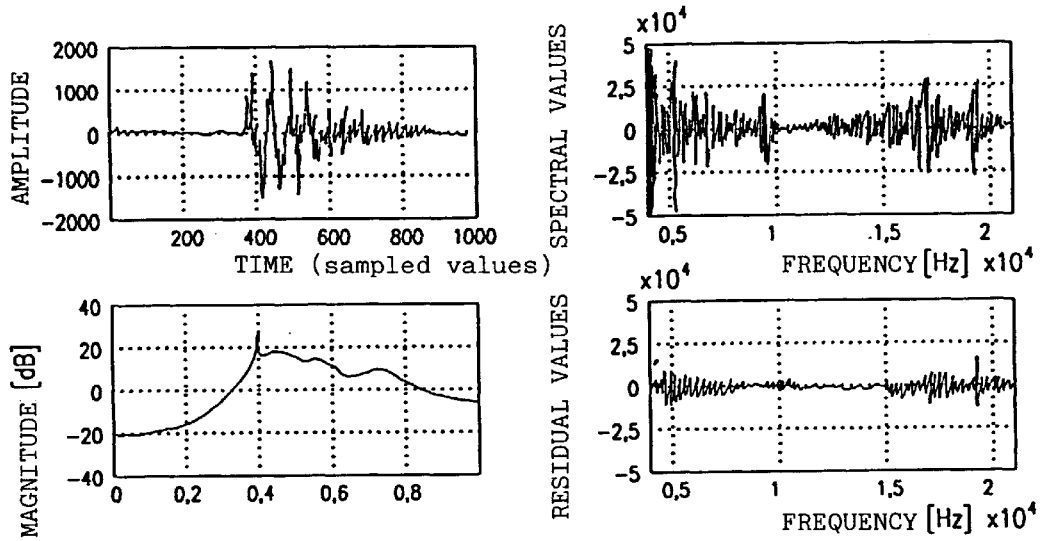
FIG. 8A shows an example for illustrating the TNS technique.
Figure 8B:
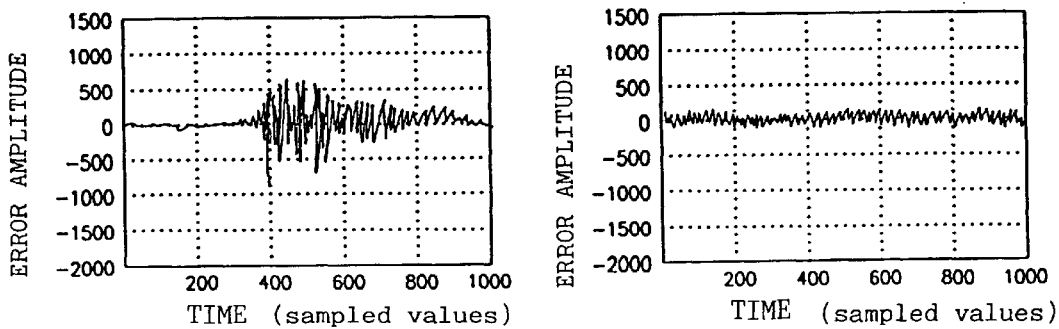
FIG. 8B shows a comparison of the temporal behaviour of an induced quantization noise with (left) and without (right) the TNS technique.
Figure 9A:
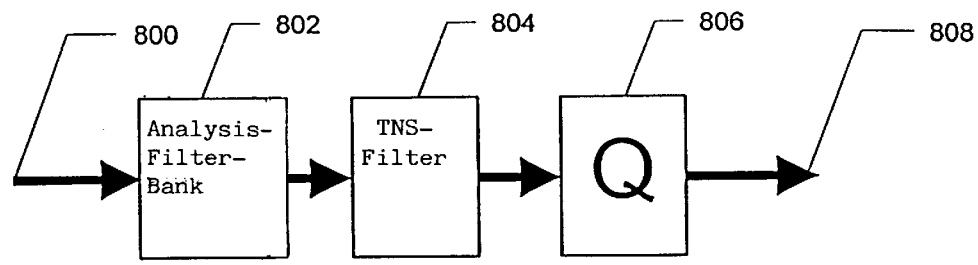
FIG. 9A shows a simplified block diagram of an unscalable coder with a TNS filter.
Figure 9B:
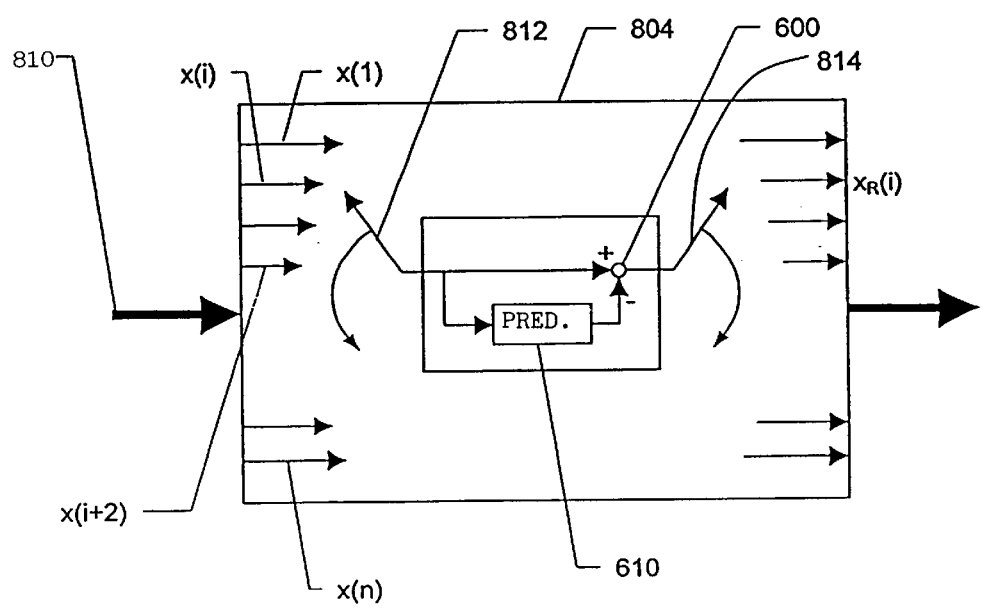
FIG. 9B shows a detailed diagram of the TNS filter of FIG. 9A.
Figure 10A:
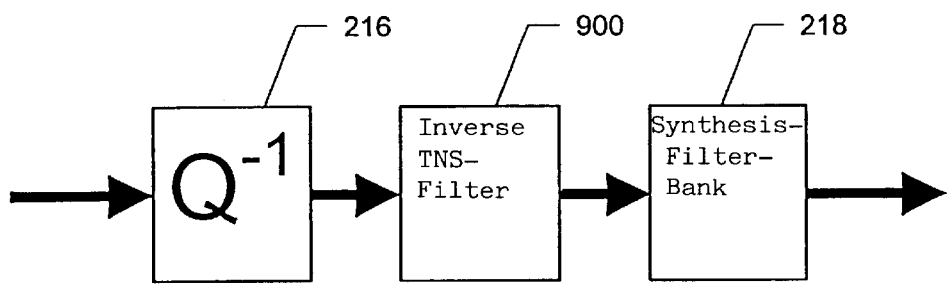
FIG. 10A shows a simplified block diagram of an unscalable decoder with an inverse TNS filter.
Figure 10B:
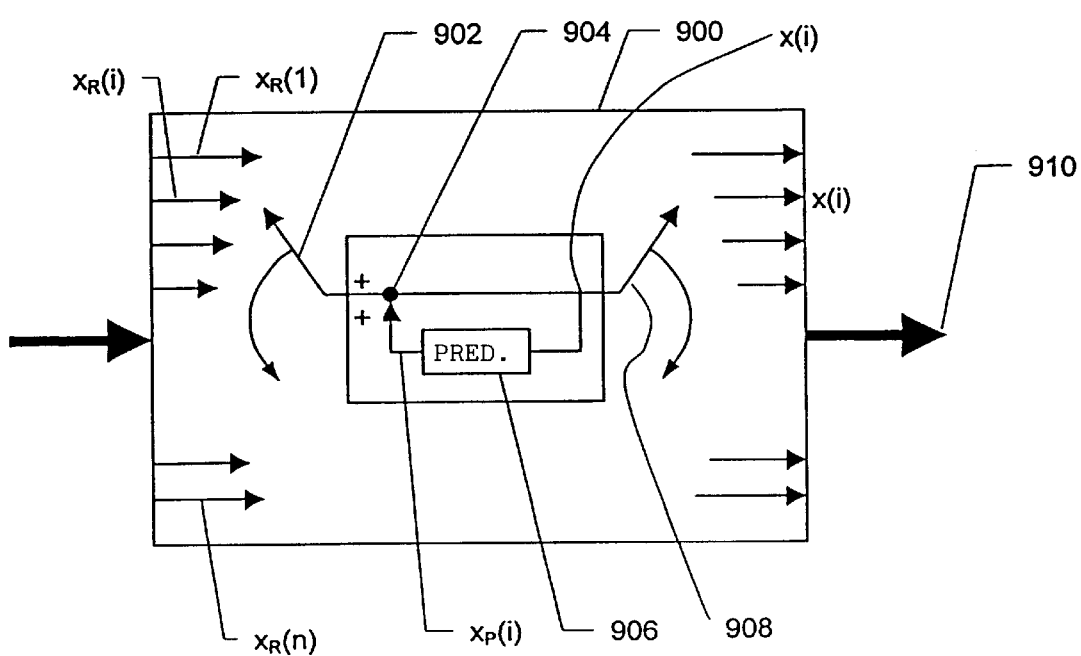
FIG. 10B shows a detailed diagram of the inverse TNS filter of FIG. 10A.

FIG. 4 shows a decoder similar to that in FIG. 3. However the decoder shown in FIG. 4 works for signals which have been coded according to the second aspect of the present invention. In contrast to FIG. 3 the inverse switching module 60 works with TNS coded input signals, whereas the inverse switching module 60 of FIG. 3 works with non-TNS-processed input signals, i.e. TNS-decoded signals. Since the output signal of the decoder 50 was not TNS-coded anywhere, not even in the coder, it must be filtered by a TNS coding filter 27, which can be implemented in the same way as the TNS coding filters 27 of FIG. 1 and FIG. 2. In the decoder according to the second aspect of the present invention the concluding TNS decoding filter 59 is located directly in front of the inverse filter bank 66, which can reverse the filter bank operations of the filter banks 22 and 24. This arrangement is preferred since it corresponds to the arrangement shown in FIG. 10A, which can normally be found in transform coders. Both the TNS decoding filter 59 and the TNS coding filter 27 are supplied with prediction coefficients, which the demultiplexer 46 extracts from the side information of the coded bit stream $x_{aus}$.

The additional TNS coding filter 27 in the decoder according to FIG. 4 represents only a minimally higher outlay, since the parameters ascertained during the TNS filter parameter determination are transmitted in any case so as to be able to calculate the TNS decoding filter. The same are also sufficient to calculate the TNS coding filter in the decoder. No change is needed in the transmitted bit stream.

For persons skilled in the art it is obvious that the example which has been presented, in which the first sampling frequency is 48 kHz and the second sampling frequency is 8 kHz, is simply exemplary. A smaller frequency than 8 kHz may also be used as the second lower sampling frequency. As sampling frequencies for the whole system the following frequencies may be used: 48 kHz, 44.1 kHz, 32 kHz, 24 kHz, 22.05 kHz, 16 kHz, 8 kHz or some other suitable sampling frequency. The bit rate range of the coder/decoder 14 of the first stage can, as already mentioned, range from 4.8 kbits per second up to 8 kbits per second. The bit rate range of the second coder in the second stage can range from 0 to 64, 69.659, 96, 128, 192 and 256 kbits per second at sampling rates of 48, 44.1, 32, 24, 16 and 8 kHz. The bit rate range of the coder in the third stage can range from 8 kbits per second to 448 kbits per second for all sampling rates.

What is claimed is:

1. A method for coding discrete first time signals which have been sampled with a first sampling rate, comprising the following steps:

generating second time signals, whose bandwidth corresponds to a second sampling rate, from the first time signals, the second sampling rate being equal to or less than the first sampling rate;

coding the second time signals according to a first coding algorithm to obtain coded second signals;

decoding the coded second signals according to the first coding algorithm to obtain coded/decoded second time signals whose bandwidth corresponds to the second sampling frequency;

transforming the first time signals into the frequency domain to obtain first spectral values;

calculating prediction coefficients from the first spectral values;

generating second spectral values from coded/decoded second time signals, the second spectral values being a representation of the coded/decoded second time signals in the frequency domain;

evaluating the first spectral values with the second spectral values to obtain evaluated spectral values whose number corresponds to the number of the first spectral values;

performing a prediction of the evaluated spectral values over the frequency by means of the calculated prediction coefficients to obtain evaluated residual spectral values; and coding the evaluated residual spectral values according to a second coding algorithm to obtain coded evaluated residual spectral values.

2. A method for coding discrete first time signals which have been sampled with a first sampling rate, comprising the following steps:

generating second time signals, whose bandwidth corresponds to a second sampling rate, from the first time signals, the second sampling rate being equal to or less than the first sampling rate;

coding the second time signals according to a first coding algorithm to obtain coded second signals;

decoding the coded second signals according to the first coding algorithm to obtain coded/decoded second time signals whose bandwidth corresponds to the second sampling frequency;

transforming the first time signals into the frequency domain to obtain first spectral values;

calculating prediction coefficients from the first spectral values;

generating second spectral values from coded/decoded second time signals, the second spectral values being a representation of the coded/decoded second time signals in the frequency domain;

performing a prediction of the first spectral values and the second spectral values over the frequency to obtain first residual spectral values and second residual spectral values, using the calculated prediction coefficients;

evaluating the first residual spectral values with the second residual spectral values to obtain evaluated residual spectral values whose number corresponds to the number of the first spectral values; and coding the evaluated residual spectral values according to a second coding algorithm to obtain coded evaluated residual spectral values.

3. A method for decoding a bit stream which represents an audio signal, where the bit stream has signals coded according to a first coding algorithm, signals coded according to a second coding algorithm, and side information, where the signals coded according to the second coding algorithm have coded residual spectral values, where the residual spectral values are generated from evaluated spectral values by prediction over the frequency, where prediction coefficients of the prediction are present in the side information, comprising the following steps:

decoding the coded signals which have been coded according to the first coding algorithm to obtain coded/decoded second time signals by means of the first coding algorithm;

decoding the coded residual spectral values by means of the second coding algorithm to obtain the residual spectral values;

transforming the coded/decoded second time signals into the frequency domain to obtain the second spectral values;

performing an inverse prediction with the evaluated residual spectral values using the prediction coefficients which are present in the side information to obtain the evaluated spectral values;

inversely evaluating the evaluated spectral values and the second spectral values to obtain the first spectral values; and transforming the first spectral values back into the time domain to obtain first time signals.

4. A method for decoding a bit stream which represents an audio signal, where the bit stream has signals coded according to a first coding algorithm, signals coded according to a second coding algorithm, and side information, where the signals coded according to the second coding algorithm have coded residual spectral values, where the residual spectral values are generated from evaluated spectral values by prediction over the frequency, where prediction coefficients of the prediction are present in the side information, comprising the following steps:

decoding the coded signals which have been coded according to the first coding algorithm to obtain coded/decoded second time signals by means of the first coding algorithm;

decoding the coded residual spectral values by means of the second coding algorithm to obtain the residual spectral values;

transforming the coded/decoded second time signals into the frequency domain to obtain the second spectral values;

performing a prediction with the second spectral values using the prediction coefficients which are present in the side information to obtain second residual spectral values;

inversely evaluating the evaluated residual spectral values and the second residual spectral values to obtain the residual spectral values;

performing an inverse prediction with the residual spectral values using the prediction coefficients which are stored in the side information to obtain first spectral values; and transforming the first spectral values back into the time domain to obtain first time signals.

5. An apparatus for coding discrete first time signals which have been sampled with a first sampling rate, comprising the following features:

a device for generating second time signals, whose bandwidth corresponds to a second sampling rate, from the first time signals, the second sampling rate being equal to or less than the first sampling rate;

a first coder for coding the second time signals according to a first coding algorithm to obtain coded second signals;

a decoder for decoding the coded second signals according to the first coding algorithm to obtain coded/decoded second time signals whose bandwidth corresponds to the second sampling frequency;

a transformer for transforming the first time signals into the frequency domain to obtain first spectral values;

a calculator for calculating prediction coefficients from the first spectral values;

a device for generating second spectral values from coded/decoded second time signals, the second spectral values being a representation of the coded/decoded second time signals in the frequency domain;

a device for evaluating the first spectral values with the second spectral values to obtain evaluated spectral values whose number corresponds to the number of the first spectral values;

a predictor for performing a prediction of the evaluated spectral values over the frequency by means of the calculated prediction coefficients to obtain evaluated residual spectral values; and a second coder for coding the evaluated residual spectral values according to a second coding algorithm to obtain coded evaluated residual spectral values.

6. An apparatus for coding discrete first time signals which have been sampled with a first sampling rate, comprising the following features:

a device for generating second time signals, whose bandwidth corresponds to a second sampling rate, from the first time signals, the second sampling rate being equal to or less than the first sampling rate;

a first coder for coding the second time signals according to a first coding algorithm to obtain coded second signals;

a decoder for decoding the coded second signals according to the first coding algorithm to obtain coded/decoded second time signals whose bandwidth corresponds to the second sampling frequency;

a transformer for transforming the first time signals into the frequency domain to obtain first spectral values;

a calculator for calculating prediction coefficients from the first spectral values;

a device for generating second spectral values from coded/decoded second time signals, the second spectral values being a representation of the coded/decoded second time signals in the frequency domain;

a predictor for performing a prediction of the first spectral values and the second spectral values over the frequency to obtain first residual spectral values and second residual spectral values, using the calculated prediction coefficients;

a device for evaluating the first residual spectral values with the second residual spectral values to obtain evaluated residual spectral values whose number corresponds to the number of the first spectral values; and a second coder for coding the evaluated residual spectral values according to a second coding algorithm to obtain coded evaluated residual spectral values.

7. An apparatus for decoding a bit stream which represents an audio signal, where the bit stream has signals coded according to a first coding algorithm, signals coded according to a second coding algorithm, and side information, where the signals coded according to the second coding algorithm have coded residual spectral values, where the residual spectral values are generated from evaluated spectral values by prediction over the frequency, where prediction coefficients of the prediction are present in the side information, comprising the following features:

- a first decoder for decoding the coded signals which have been coded according to the first coding algorithm to obtain coded/decoded second time signals by means of the first coding algorithm;
- a second decoder for decoding the coded residual spectral values by means of the second coding algorithm to obtain the residual spectral values;
- a transformer for transforming the coded/decoded second time signals into the frequency domain to obtain the second spectral values;
- an inverse predictor for performing an inverse prediction with the evaluated residual spectral values using the prediction coefficients which are present in the side information to obtain the evaluated spectral values;
- a device for inversely evaluating the evaluated spectral values and the second spectral values to obtain the first spectral values; and
- an inverse transformer for transforming the first spectral values back into the time domain to obtain first time signals.

8. An apparatus for decoding a bit stream which represents an audio signal, where the bit stream has signals coded according to a first coding algorithm, signals coded according to a second coding algorithm, and side information, where the signals coded according to the second coding algorithm have coded residual spectral values, where the residual spectral values are generated from evaluated spectral values by prediction over the frequency, where prediction coefficients of the prediction are present in the side information, comprising the following features:

- a first decoder for decoding the coded signals which have been coded according to the first coding algorithm to obtain coded/decoded second time signals by means of the first coding algorithm;
- a second decoder for decoding the coded residual spectral values by means of the second coding algorithm to obtain the residual spectral values;
- a transformer for transforming the coded/decoded second time signals into the frequency domain to obtain the second spectral values;
- a predictor for performing a prediction with the second spectral values using the prediction coefficients which are present in the side information to obtain second residual spectral values;
- a device for inversely evaluating the evaluated residual spectral values and the second residual spectral values to obtain the residual spectral values;
- an inverse predictor for performing an inverse prediction with the residual spectral values using the prediction coefficients which are stored in the side information to obtain first spectral values; and
- an inverse transformer for transforming the first spectral values back into the time domain to obtain first time signals.

* * * * *